US012126623B1

(12) United States Patent
Gupta et al.

(10) Patent No.: US 12,126,623 B1
(45) Date of Patent: Oct. 22, 2024

(54) AGGREGATED AUTHORIZATION TOKEN

(71) Applicant: Citibank, N.A., New York, NY (US)

(72) Inventors: Abhishek Gupta, Irving, TX (US);
Mohan Madala, New York, NY (US);
Rasabihari Rath, Irving, TX (US);
Simranjit Singh Rekhi, New York, NY (US);
Prashant Sharma, Irving, TX (US);
Marina Trost, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/651,556

(22) Filed: Apr. 30, 2024

(51) Int. Cl.
*H04L 9/40* (2022.01)

(52) U.S. Cl.
CPC ......... *H04L 63/102* (2013.01); *H04L 63/105* (2013.01); *H04L 63/20* (2013.01)

(58) Field of Classification Search
CPC ...... H04L 63/102; H04L 63/105; H04L 63/20
See application file for complete search history.

(56) References Cited

U.S. PATENT DOCUMENTS

| | | | | |
|---|---|---|---|---|
| 8,966,599 B1* | 2/2015 | Barrows | ............ | H04L 63/0846 |
| | | | | 705/37 |
| 9,176,720 B1* | 11/2015 | Day-Richter | ............ | G06F 8/63 |
| 9,635,028 B2* | 4/2017 | Shepard | ................... | G06F 21/44 |
| 9,699,170 B2* | 7/2017 | Sondhi | .................... | H04L 63/10 |
| 10,887,301 B1* | 1/2021 | Vera | ..................... | H04L 9/3239 |
| 11,048,809 B1* | 6/2021 | Sun | ....................... | H04L 63/108 |
| 11,050,691 B1* | 6/2021 | DePue | ............... | H04W 12/062 |
| 11,233,799 B1* | 1/2022 | Whyte | .................... | G06F 21/44 |
| 11,379,614 B1* | 7/2022 | Babani | .................... | G06F 21/43 |
| 11,379,617 B1* | 7/2022 | Dissanayake | ........ | G06Q 20/382 |
| 11,496,483 B1* | 11/2022 | Babani | ............... | G06F 21/6218 |
| 11,606,210 B1* | 3/2023 | Madden | ................. | H04L 63/10 |
| 11,971,881 B1 | 4/2024 | Surendran et al. | | |
| 2009/0089803 A1* | 4/2009 | Biggs | .................... | G06F 21/554 |
| | | | | 726/21 |
| 2012/0173881 A1* | 7/2012 | Trotter | .................. | H04L 9/0894 |
| | | | | 713/189 |
| 2013/0067568 A1* | 3/2013 | Obasanjo | ................ | G06F 21/31 |
| | | | | 726/20 |
| 2014/0007195 A1* | 1/2014 | Gupta | ................. | H04L 63/0876 |
| | | | | 726/4 |
| 2014/0282852 A1* | 9/2014 | Vestevich | ............... | G06F 21/52 |
| | | | | 726/1 |
| 2015/0074826 A1* | 3/2015 | Shuto | ............... | H04N 21/41407 |
| | | | | 726/28 |
| 2015/0200948 A1* | 7/2015 | Cairns | ..................... | G06F 21/44 |
| | | | | 726/4 |
| 2017/0169249 A1* | 6/2017 | de Oliveira | ......... | G06F 21/6245 |
| 2017/0249478 A1* | 8/2017 | Lovin | .................... | G06F 21/6245 |
| 2017/0302451 A1* | 10/2017 | Wang | .................... | H04L 9/3213 |
| 2018/0033053 A1* | 2/2018 | Barak | ................... | H04L 67/535 |
| 2018/0121646 A1* | 5/2018 | Sakanashi | .............. | H04L 63/00 |

(Continued)

*Primary Examiner* — Jason Chiang
(74) *Attorney, Agent, or Firm* — Davis Wright Tremaine LLP

(57) ABSTRACT

An application programming interface (API) call is received to obtain an access data object that includes a permission of an application provider to access a resource of an entity. A previous permission to access a second resource of the entity is identified. As a result of receiving the API call, an access data object is generated to include the permission and the previous permission.

20 Claims, 8 Drawing Sheets

(56) References Cited

U.S. PATENT DOCUMENTS

| | | | | |
|---|---|---|---|---|
| 2018/0191700 A1* | 7/2018 | Kong | .................. | H04L 63/0807 |
| 2020/0104519 A1* | 4/2020 | Farber | ................. | H04L 63/0807 |
| 2020/0120083 A1* | 4/2020 | Kaladgi | ............... | G06F 21/604 |
| 2021/0075782 A1* | 3/2021 | Dunjic | ................. | G06F 9/4451 |
| 2021/0084038 A1* | 3/2021 | Feasel | ................. | G06F 21/629 |
| 2021/0109901 A1* | 4/2021 | Tucker | ................. | G06F 16/182 |
| 2021/0286861 A1* | 9/2021 | Churchill | ............... | G06F 21/31 |
| 2021/0409402 A1* | 12/2021 | Tulshibagwale | .... | H04L 63/0892 |
| 2022/0171772 A1* | 6/2022 | Vanderploeg | ..... | G06F 16/24547 |
| 2022/0207636 A1* | 6/2022 | Nalluri | ............... | G06F 21/6245 |
| 2022/0350907 A1* | 11/2022 | Shankar | ................. | G06F 21/31 |
| 2023/0010786 A1* | 1/2023 | Korwin-Gajkowski | ..................... H04L 63/10 | |
| 2023/0101530 A1* | 3/2023 | Bhat | ..................... | G06F 21/645 726/20 |
| 2023/0126355 A1* | 4/2023 | Anani | ..................... | H04L 63/10 726/27 |
| 2023/0128813 A1* | 4/2023 | Babani | ............... | G06F 21/6245 726/4 |
| 2023/0179417 A1* | 6/2023 | James | ..................... | H04L 63/10 713/168 |
| 2023/0222137 A1* | 7/2023 | Aucinas | .................. | H04L 63/10 707/802 |
| 2023/0308429 A1* | 9/2023 | Landais | .................. | H04L 67/56 |
| 2023/0396602 A1* | 12/2023 | Wu | ..................... | H04W 12/009 |

* cited by examiner

Token Structure
312

| Token Attributes | Data type | Description |
|---|---|---|
| Client ID | String | 3rd party provider ID (e.g., "fTs5TTgfBslHAFdP8IKhF7ZJI3tEHcEG") |
| User ID | String | End user ID (e.g., "1234567890") |
| Scope | List | List of scopes (e.g., "ADT", "AS", "CP", etc.) |
| Expiration Date. | Date | Expiry date and time (e.g., 2024-01-01T12:34:55.000Z) |

FIG. 3

AGGREGATED AUTHORIZATION TOKEN

BACKGROUND

Third-party provider authorization models typically require a user to have a separate open authorization (OAuth) token for every fourth-party application or service provider that the user authorizes to access the user's data. Storing and managing these numerous tokens is costly in terms of storage space, infrastructure, and labor. Transmitting these numerous tokens also uses up valuable network bandwidth and creates additional infrastructure costs.

BRIEF DESCRIPTION OF THE DRAWINGS

Various techniques will be described with reference to the drawings, in which:

FIG. 3 illustrates an example of an access token structure, in accordance with an embodiment;

DETAILED DESCRIPTION

Figure 1:
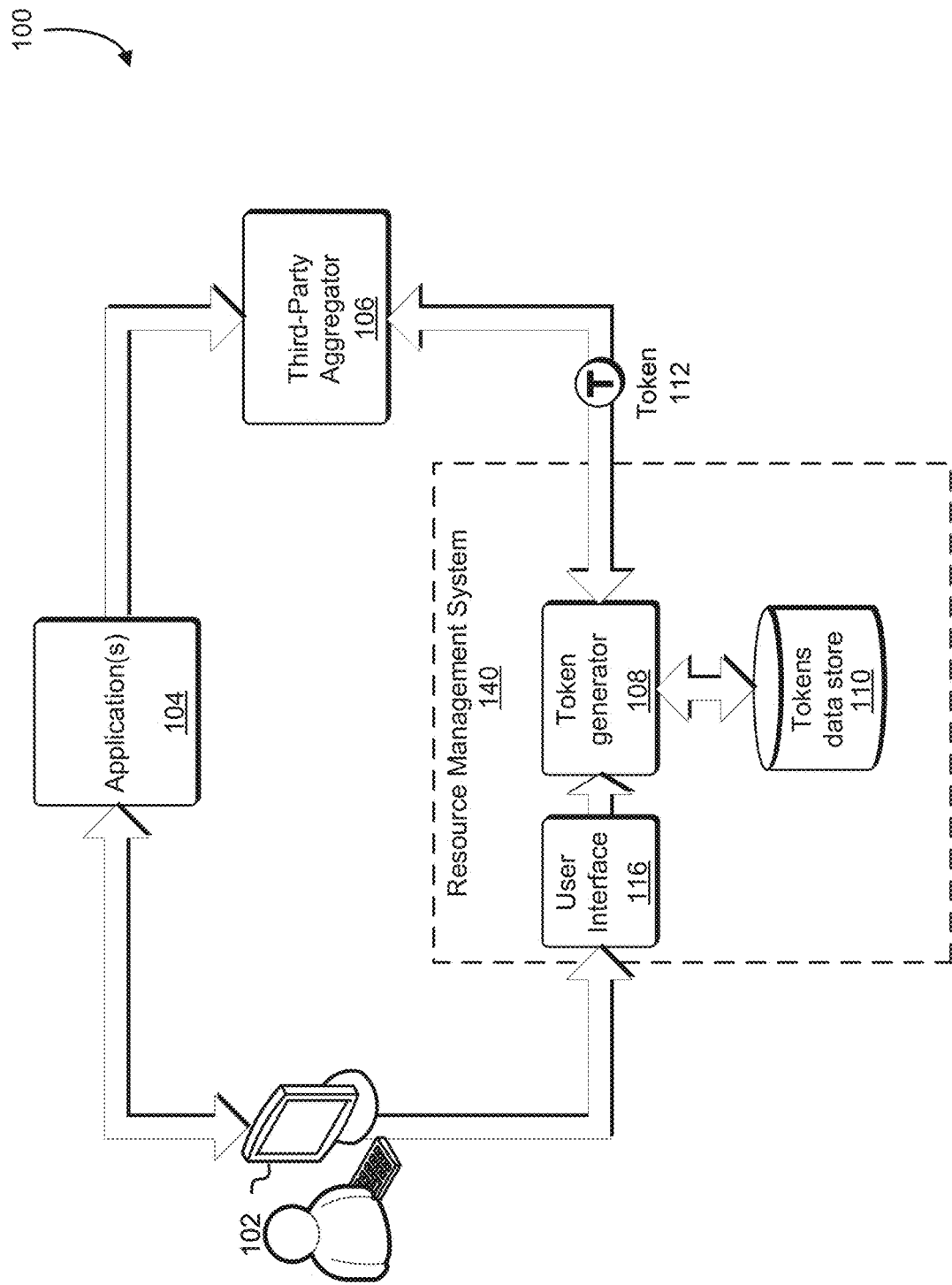
FIG. 1 an example of an overview of a resource management and authorization system, in accordance with an embodiment.

The present application describes systems and techniques to provide authorization to access user resources, via a third-party provider, by assigning a single token to represent the permissions of all fourth-party applications by the user. Third-party providers, also known as third-party aggregators or token storage systems, can have thousands of applications on-boarded that the third-party providers connect through to resources management systems. In this disclosure, a token structure is implemented that allows a resource management system to issue one token to administer all the tokens that have been consented to by the user for a user's applications and resources. In at least one embodiment, a system receives an application programming interface (API) call to obtain an access token that includes a permission of an application or service provider to access resources of a user of the system. Further in the embodiment, the system identifies a previous permission to access other resources of the entity. Then, in the embodiment, as a result of receiving the API call, the system generates the access token to include the permission and the previous permission. In at least one embodiment, the access token may grant access of user resources to multiple applications, and all of the credentials associated with the multiple applications are specified with just one access token.

In at least one embodiment, a system aggregates permissions of previous tokens and provides one token to a third-party aggregator, and the same token can be used for all permissions of scopes of the resources that has been consented to by a user of the system. For example, if the system receives an API call to obtain an access token including a permission of a service provider to access resources and the user consents, then the system what issue and access token to cover the permission and the scopes. If the same user subsequently consents to another request of a different service provider to access resources with a different scope, then the system issues a new token to include the previous permission and the new permission, band the previous token is revoked. The third-party aggregator stores the token and uses it to retrieve user resources, as needed, or for subsequent queries by service providers to access resources that have been consented to by the user.

In at least one embodiment, a system uses the access token to determine that a service provider is authorized to access a resource of user of the system and causes a token storage service provider to communicate with the service provider and provide the service provider access to the resources of the user. In this case, the includes a permission of the service provider to access the resource including the scope (e.g., the extent or range of view of the subject matter). In at least one embodiment, the system uses the access token to determine that a service provider is not authorized to access a resource of user of the system and causes the token storage service provider to communicate with the service provider and decline access to the resource of the user. In this case, the token does not include a permission of the service provider to obtain access to the resource of the user, if, for example, the user did not consent to a permission request of the user to obtain access to the resource or the user may have revoked an existing permission of the service provider.

In one example, the system generates and issues, to the token storage service, a token corresponding to the request from the fourth-party application to obtain access to resources of a user of the resource management system. The token storage service may query the resource management system using this token to obtain the resources that have been consented to by the user to authorize respective fourth-party applications access to the resources. The token may include identifier information corresponding to parameters of the resources to be obtained. In response to obtaining the token from the token storage service, the resource management system may evaluate the token and determine whether it is valid (e.g., has not expired, is authentic, etc.). If the token is valid, the resource management system may determine whether the token includes a permission for the fourth party to access the resources. For example, the resource management system may evaluate a list of permissions that specifies the various permission information corresponding to different fourth-party applications that are available to determine whether the requested resources or information has been consented to by the user to authorize the respective application to access the requested resources (e.g., corresponding to a specific scope of access). If so, the resource management system may obtain the requested resources from a database repository maintained by the resource management system and provide the requested information to the token storage service.

Techniques described and suggested in the present disclosure improve the field of computing, especially the field of open permission, by generating an access token that includes multiple permissions of applications to access resources of a user. Additionally, techniques described and suggested in the present disclosure improve the efficiency/functioning of servers and computing systems by reducing the amount of storage needed to store multiple tokens and reducing network traffic that would otherwise consume large amounts of network resources. For example, reducing network traffic will result in reduced infrastructure cost. Moreover, techniques described and suggested in the present disclosure are necessarily rooted in computer technology in order to overcome problems specifically arising with the computing resources required to store tokens and send and receive API calls to obtain tokens for every application that requests access to resources in the resource management system. Further, the techniques of this disclosure overcome these problems by reducing the number of tokens assigned to a customer, which reduces the amount of storage needed for the tokens, reduces the volume of network traffic, and reduces the complexity in maintaining the tokens.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

The present disclosure also provides computer programs and computer program products comprising software code adapted, when executed on a data processing apparatus, to perform any of the methods and/or for embodying any of the apparatus and system features described herein, including any or all of the component steps of any method. The present disclosure also provides a computer or computing system (including networked or distributed systems) having an operating system that supports a computer program for carrying out any of the methods described herein and/or for embodying any of the apparatus or system features described herein. The present disclosure also provides a computer readable media having stored thereon any one or more of the computer programs aforesaid. The present disclosure also provides a signal carrying any one or more of the computer programs aforesaid. The present disclosure extends to methods and/or apparatus and/or systems as herein described with reference to the accompanying drawings. To further describe the present technology, examples are now provided with reference to the figures.

FIG. 1 illustrates an aspect of an environment 100 for a resource management system 140 in which an embodiment may be practiced. In some embodiments, users 102 of this environment 100 include but are not limited to client users of the resource management system 140. In at least one embodiment, as illustrated in FIG. 1, the environment 100 includes a resource management system 140 as described herein, that receives, via a third-party provider, alternatively known as a third-party aggregator 106, an application programming interface (API) request from an application(s) 104 to obtain an access code to access resources of the user. As a result of receiving consent from the user 102 to authorize the application(s) 104 to access the resources, a token generator 108 of the system obtains an access token 112 from a token data store 110. The terms "data store" and "data storage" are used interchangeably and are intended to have corresponding scope.

In some examples, an access token (or just "token" for short) as used in the present disclosure refers to a data object (also known as an "access data object") that encapsulates permission and scope of access information usable to make decisions about whether to grant an entity access to a resource. The access token may include an identity of a user owner of the resource, an identity of an entity or software application seeking access to the resource, and a scope of access privilege allowed to the entity for the resource. In some embodiments, the access token may be provided in lieu of credentials such as a username and/or password. In some embodiments, the access token is used to represent only such permission and scope of access information. In other embodiments, the access token may be capable of holding additional data that can be attached while the access token is being created. In some implementations, access tokens can be duplicated without special privilege, for example, to create a new access token with lower levels of access rights to restrict the access of a software application.

In at least one embodiment, the user 102 of this environment 100 include but are not limited to client users of the resource management system 140. In at least one embodiment, the user 102 may be an individual, a computing system, an executing software application, a computing service, a computing resource, or other entity capable of controlling input to and receiving output from a resource management system 140. The user 102 may have access to a set of user records and/or a profile with the resource management system 140, and may have a set of credentials (e.g., username, password, etc.) registered with the resource management system 140. In at least one embodiment, user 102 presents, or otherwise proves, the possession of security credentials, such as by inputting a password, access key, and/or digital signature, to gain access to resources of a user account. The user 102 may be a customer of the resource management system. In at least one embodiment, the user 102 creates, using a user device or other computing device, an account with the resource management system 140. In at least one embodiment, user 102 receives a request from a token storage service, such as third-party aggregator 106, to obtain an access token that includes a permission of a service provider, such as application(s) 104, to access resources of the user 102. In at least one embodiment, in response to the request from a token storage service, the user 102 provides consent to authorize the service provider to access the resources. In the present disclosure, consent refers to agreement consent (e.g., to what is proposed), and may also be referred to as but is not limited to agree, acquiesce, assent, or subscribe.

In at least one embodiment, application(s) 104 is a computing resource service that allows users to perform one or more specific functions that include but are not limited to resource management, data sharing, and/or information sharing, either through a computer system or a mobile device. In at least one embodiment, the application(s) 104 is a software application developed for use on a wireless computing device, such as smartphones, tablets, smartwatches, and/or augmented reality devices.

In at least one embodiment, the third-party aggregator 106 is a services provider that facilitates data transfer between the resource management system and service providers, such as application(s) 104. In at least one embodiment, third-party aggregator 106 may perform operations to aggregate data resources of the user 102 and provide these data resources to the application(s) 104. In at least one embodiment, the operation performed by the third-party aggregator 106 may be initiated via an application programming interface (API). In at least one embodiment, the API is invoked by or on behalf of the third-party aggregator 106 to a system, such as resource management system 140 in the environment 100 depicted in FIG. 1.

In at least one embodiment, the token generator 108 may be a computing system, software, software program, hardware device, module, or component capable of generating and/or re-generating an access token, such as token 112, by at least obtaining tokens from a token data store 110. In response to obtaining an API call from the third-party aggregator 106, the token generator 108 may generate a token, such as token 112, that may be used by the third-party aggregator 106 to submit queries on behalf of the application(s) 104, where the token 112 operates as proof of permission by the user 102 to fulfill the queries.

In at least one embodiment, the token database storage system, also referred to as tokens data store 110, is a repository providing non-transitory and persistent (non-volatile) storage for data objects. Examples of data stores include file systems, relational databases, non-relational databases, object-oriented databases, comma delimited files, and other files. In some implementations, the token data store 110 is a distributed data store. The token data store 110 may store access tokens and information related to access tokens for the user 102 and information identifying tokens associate with the user 102 of the resource management system 140.

In at least one embodiment, the token 112 may include but is not limited to an identifier of the application(s) 104, an identifier of the client, such as the third-party aggregator 106, an identifier of the user 102, scope of the authorized resources, and an expiration date indicating when the token 112 will expire. In at least one embodiment, the token 112 may include information usable by the resource management system 140 to determine whether the application(s) 104 specified therein is authorized to obtain the requested information. In at least one embodiment, credential information includes a combination of a username and corresponding password of the user, the application, or other entity of the user device. In some embodiments, actual credentials may not be included in the token, in which case the credential information may also include cryptographic information that is verifiable by the resource management system 140 as corresponding to authentic credentials.

In at least one embodiment, the resource management system 140 may comprise a collection of computing resources that collectively operate to enable users of the resource management system 140 to obtain resources and information related to a user account of the resource management system 140 and to provide users with flexibility to generate their own tools and libraries using their own computing devices and utilize these tools and libraries locally to process information from the resource management system 140. For example, resources could include details about an account of a user, account statements, an account profile, an account routing number, etc. In at least one embodiment, the resource management system 140 includes a user interface 116. In at least one embodiment, the user interface may be computer hardware or software designed to communicate information between hardware devices, between software programs, between devices and programs, or between a device and a user. In some embodiments the user interface 116 is a graphical user interface (GUI). In some embodiments, the user interface 116 is an API.

In at least one embodiment, the resource management system 140 performs operations to identify a previous permission of a different service to access another set of resources. In at least one embodiment, as a result of receiving the API call, a token generator 108 of the resource management system uses a token data store 110 to generate a new access token that includes the permission and the previous permission. In at least one embodiment, the access token aggregates a union of a plurality of permissions.

In at least one embodiment, parts, methods and/or systems described in connection with FIG. 1 are as further illustrated non-exclusively in any of FIGS. 1-8.

Figure 2:
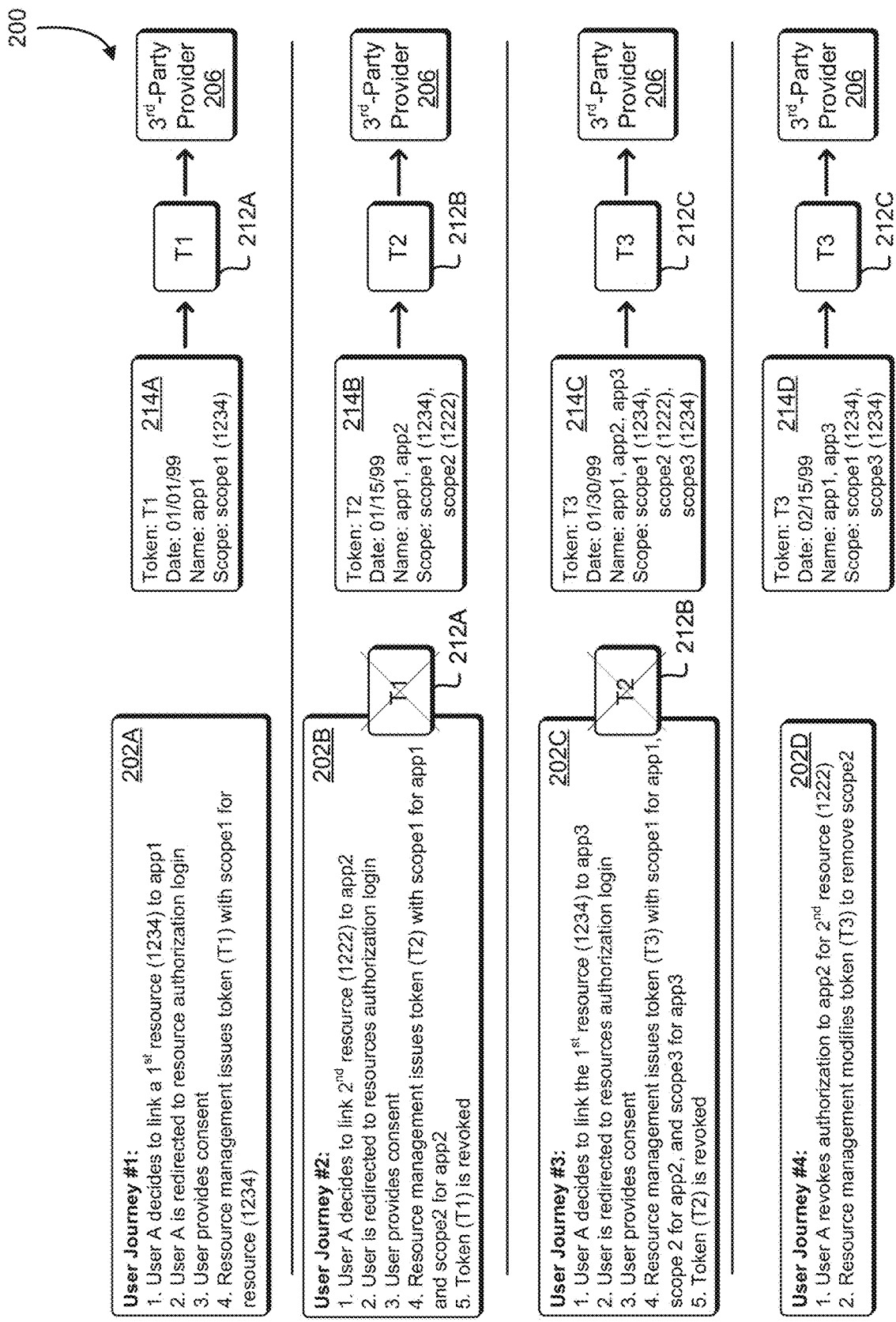
FIG. 2 an example of generating an access token, in accordance with an embodiment.

FIG. 2 illustrates an example of generating an access token, in accordance with an embodiment. As illustrated in FIG. 2, the example 200 includes four example processes performed by users (referred to as user journeys 202A-B) associated with access tokens (e.g., "T1-T3" 212A-C) of the present disclosure, the access tokens 212A-C including information corresponding to a token structure 214A-D, and the tokens T1-T3 212A-C being provided to a third-party provider 206.

In at least one embodiment, the access tokens "T1-T2" 212A-C are similar to the access token 112 in FIG. 1. In at least one embodiment, third-party provider 206 is similar to third-party aggregator 106 in FIG. 1, and the token structure 214A-B is similar to the token structure 312 in FIG. 3. In at least one embodiment, the token structure 214A-B includes a date of token issuance, a name of a service provider (e.g., "app1") requesting access to the resources of the user, and scopes of access to the resources.

In some embodiments, facilitating data sharing with a downstream application, such as the application(s) 104 in FIG. 1, a third-party aggregator, such as, third-party provider 206 may be an OAuth Client that initiates a redirect of a user, such as, the user 103 in FIG. 1 to a resource management system, such as, the resource management system 140 in FIG. 1 for authentication.

For example, in user journey #1 202A, a user of the system, such as, user 102 in FIG. 1 performs a login at an application "app1" (similar to the application(s) 104) and decides to link a resource (e.g., resource #1234) of the user with "app1." Further, in the example, the user is redirected to a login page of a resource management system, such as, resource management system 140 in FIG. 1 and provides consent, via a user interface, to authorize "app1" to access the resource(s) of the user. In at least one embodiment, the system provides the user, via the user interface, a message confirming that the user has authorized the service provider (e.g., "app1") to access resource(s) of the user. Following successful authentication and consent/confirmation by the user, the resource management system issues/generates an access token, such as, access token "T1" 212A to a third-party provider 206. In at least one embodiment, the access token is generated to include a scope, alternatively known as a scope of access "scope1," from a plurality scopes. In at least one embodiment, the scope of the plurality of scopes may be the extent or range of view of the area or subject matter that the user has consented to. The scopes may be represented by numbers, letters, and/or alphanumeric characters; for example, "ADT" could indicate permission to provide account details of the user, "AS" could indicate permission to provide account statements of the user, "ARN" cloud indicate permission to provide an account routing number, "CP" could indicate permission to provide customer profile information, and so on. In at least one embodiment, the access token "T1" is stored by third-party provider 206 and used to retrieve the resources to be requested (by the application(s) 104) using APIs of the resource management system, going forward as needed.

In user journey #2 202B, the same user of the system performs a login at an application, "app2" and decides to link a different resource (e.g., resource #1222) of the user with "app2." Further, in the example, the user is redirected to a login page of the resource management system and provides consent, via the user interface, to a authorize "app2" to access the different resource(s) of the user. In at least one embodiment, the system provides the user, via the user interface, a message confirming that the user has authorized the service provider (e.g., "app2") to access resources of the user. Following successful authentication and consent/confirmation by the user, in at least one embodiment, the resource management system identifies a previous permission of "app1" to access the resources of the user with "scope1." As a result of identifying the previous permission, the resource management system issues/generates a new access token "T2" 212B to the third-party provider 206. This access token "T2" includes both scopes "scope1" (from "T1") and "scope2," and provides permission for "app1" and "app2" to access resource "1234" with "scope1" and resource "1222" with "scope2," respectively. In at least one embodiment, as a result of identifying a previous permission of a fourth-party application, the resource management system issues/generates a new access token to aggregate all permissions of fourth-party applications that have been consent to by the user and revokes the previous access token that includes the previous permission. In this example, the resource management system would revoke the access token "T1" 212A, as being replaced by new token "T2" 212B. Revoking an access token may be performed in various ways, including deletion, or indicating in the tokens data store 110 that the revoked access token is revoked or otherwise expired. If an access token determined to be revoked, it may not be accepted as a valid permission to access a resource. In some embodiments, the resource management system may regenerate an access token to include a new permission of an application and omit a previous permission.

In user journey #3 202C, the same user of the system performs a login at an application, "app3" and decides to link a resource (e.g., resource #1234) of the user with "app3." Further, in the example, the user is redirected to a login page of the resource management system and provides consent, via a user interface, to a authorize "app3" to access the resource(s) of the user. In at least one embodiment, the system provides the user, via the user interface, a message confirming that the user has authorized the service provider (e.g., "app3") to access the resource(s) of the user. In this case, the resource management system identifies the permission for "app1" and "app2" to access resources with "scope1" and "scope2," respectively.

As a result of identifying the permissions, the resource management system issues/generates new access token "T3" 212C to the third-party provider 206. This access token "T3" includes all of scopes "scope1," "scope2," and "scope3" and permissions for "app1," "app2," and "app3" to access resources with "scope1," "scope2," and "scope3," respectively. In at least one embodiment, as a result of identifying the previous permission of the fourth-party applications, the resource management system issues/generates a new access token to aggregate all permissions of fourth-party applications that a user has provided consent to and revokes the previous access token that includes the previous permissions. In this example, the resource management system would then revoke the access token "T2" 212B, as being replaced by "T3" 212C.

In user journey #4 202D, the same user of the system decides to revoke the permission of "app2" to access the different resource (e.g., resource #1222) with "scope2." In at least one embodiment, the user initiates a revocation operation via a user interface of the resource management system. In at least one embodiment, the third-party provider 206 revokes the permission, on behalf of the user, for the application (in this example, "app2") and then notifies the resource management system that the application has been revoked. In at least one embodiment, the system provides the user, via a user interface, a message confirming that the user has revoked the service provider (e.g., "app2") from accessing resources of the user. In at least one embodiment, a user may initiate an operation to revoke an application using the resource management system. In at least one embodiment, as a result of revoking a permission (in this example, "app2"), the resource management system updates the access token to remove the permission scope. For example, as a result of revoking "app2" for data sharing of this different resource, the resource management system updates the access token "T3" 212C to remove the permission of "app2" to access this different resource of the user with "scope2," and provides the updated access token "T3" 212C to the third-party provider 206. Although the access token "T3" 212C is updated in this user journey, it is also contemplated that a new access token "T4" could be issued/generated to replace the access token "T3" 212C, which would then be revoked. In this example, if the system, subsequently, receives an API call from third-party provider 206, acting on behalf of "app2," to access this different resource (e.g., resource #1222) with "scope2," then the API call to access this different resource would be declined (e.g., "401 Unauthorized").

In at least one embodiment, a single user is connecting multiple applications (e.g., fourth-party applications) through a third-party aggregator, and the resource management system can generate an access token that grants the third-party aggregator access to the union of each application's required scopes.

In at least one embodiment, parts, methods and/or systems described in connection with FIG. 2 are as further illustrated non-exclusively in any of FIGS. 1-8.

FIG. 3 illustrates an example 300 of an access token structure, in accordance with an embodiment. As illustrated in FIG. 3, the example 300 depicts a table that includes information corresponding to a token structure 312, which includes columns that represent token attributes, data type, description, and example(s). Each column in the table begins with an entry explaining what it represents. The token structure 312 comprises information about the token type, information about the user, permissions, expiration, and verification data.

The first column begins with the entry of token attributes. In at least one embodiment, the token attributes may include, but are not limited to, client identification (ID), user identification (ID), scope, and expiration date. The second column begins with the entry of data type. In at least one embodiment, the data types of the various attributes may include but is not limited a string, list, or date.

The third column begins with the entry of description. In at least one embodiment, the description of the token attributes provides additional information about the token attributes to put into context the function of each attribute. For example, the description of the client ID attribute is a token storage provider identification. As another example, the description of the scope is a list of scopes. In at least one embodiment, the scopes may refer to permissions of the token. For example, an application that requests access of a specific resource on a server may not gain access if the token does not include a permission of the application to access the resources and corresponding scope of the content.

The last column begins with the entry of example. The entries of the "Example" column include specific examples of the various token attributes. For example, the entry in the example column for the user ID (token attribute) row is "1234567890," which is a string of characters (data type) that is unique to the user identified in the token (by the token attribute and description) of the token. In at least one embodiment, the token structure includes information that is used to verify that an entity has permission to access a resource. Note that the example 300 is just one example that may be used with the embodiments of the present disclosure, and it is contemplated that the structure of the access tokens of the present disclosure may vary from that depicted in FIG. 3.

In at least one embodiment, parts, methods and/or systems described in connection with FIG. 3 are as further illustrated non-exclusively in any of FIGS. 1-8.

Figure 4:
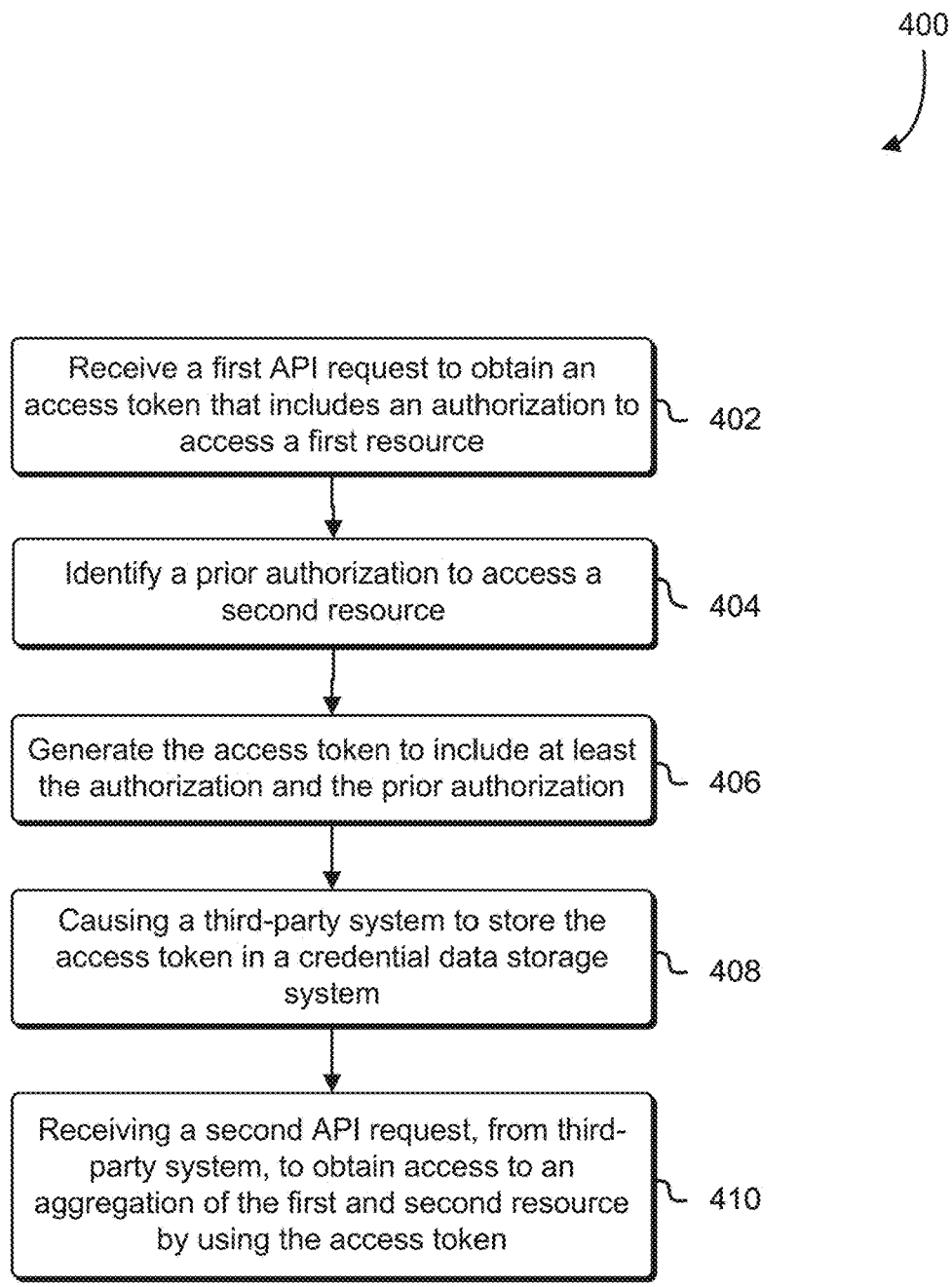
FIG. 4 is a flowchart that illustrates an example of an algorithm to generate an access token, in accordance with an embodiment.

FIG. 4 is a flowchart illustrating an example of a process 400 of an algorithm to generate an access token, in accordance with various embodiments. Specifically, the process 400 describes a process for aggregating scopes when at least one currently token exists with a previous permission of scope of access. Some or all of the process 400 (or any other processes described, or variations and/or combinations of those processes) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing device 800 of FIG. 8. The process 400 includes a series of operations wherein a request is received by the system performing the process 400 to obtain an access token that includes a permission of a service provider to access a resource, a previous permission to access other resources is identified, and, as a result of receiving the request, the access token is generated that includes the permission and the previous permission.

In at least one embodiment, in 402, one or more processors of a resource management system, or alternatively known as a computing system or system, receives an application programming interface (API) request to obtain an access token that includes a permission of a service provider to access resources of an end user of the resource management system. In at least one embodiment, the API is received from the token storage provider and includes a client identification, user identification, and scopes being sought (e.g., user profile).

In at least one embodiment, in 404, the one or more processors of the resource management system identifies a previous permission of to access resources of the end user of the resource management system. A scope indicating the previous permission may be included in a currently existing token. In some cases, the previous permission may be a previous permission to a different service provider to access the same or different resources of the end user. In other cases, the previous permission may be to the same service provider but for different resources of the end user.

In at least one embodiment, in 406, the one or more processors of the resource management system, as a result of receiving the API call, generate the new access token to include at least the permission of the service provider to access the resources and the previous permission of the different service provider to access the other resources of the end user of the resource management system.

In at least one embodiment, in 408, the one or more processors of the resource management system causes a token storage provider to store the access token in an access token data storage system. In some embodiments, the previous token (e.g., the currently existing token that included the previous permission) is indicated in the access token data storage system as being revoked, having been replaced by the newly generated access token that includes both the permission and the previous permission.

In at least one embodiment, in 410, the one or more processors of the resource management system receive a second API call, from the token storage provider service, to obtain access to an aggregation of the first and second resource of the end user of the resource management system by using the access token. In at least one embodiment, the token storage provider uses one token to administer all the tokens that have been consented to by the user. In at least one embodiment, the system receives an API call to obtain access to all the resources that a user has consented to for data sharing with fourth-party applications, such as the application(s) 104 in FIG. 1.

In at least one embodiment, an API request to obtain an access token that includes permission from a user, if executed, returns a permission code, which a third-party service may exchange for an access token and refresh token. For example, this third-party system may exchange the permission code for a pair of access and refresh tokens, and use the tokens to obtain access to resources associated with an end user. In at least one embodiment, when the third-party system performs operations to refresh data on behalf of the customer, it calls the refresh endpoint of the system that generates a refresh token. In at least one embodiment, if the third-party system refreshes that refresh token, via the system, at least once in the 30 day span, then the third-party system may continue to operate for 12 months. Further, in the embodiment, after the 12 months has expired, then the system may cause the user to reconsent to permissions for the applications to access the respective resources.

In at least one embodiment, an exemplary process 400 includes a processor using one or more circuits of a resource management system to obtain an access token that includes a plurality of permissions of service providers to access resources of an end user of the resources management system and/or otherwise perform operations described herein. In at least one embodiment, parts, methods and/or systems described in connection with FIG. 4 are as further illustrated non-exclusively in any FIG. 1-8. Note that one or more of the operations performed in 404-10 may be performed in various orders and combinations, including in parallel.

Figure 5:
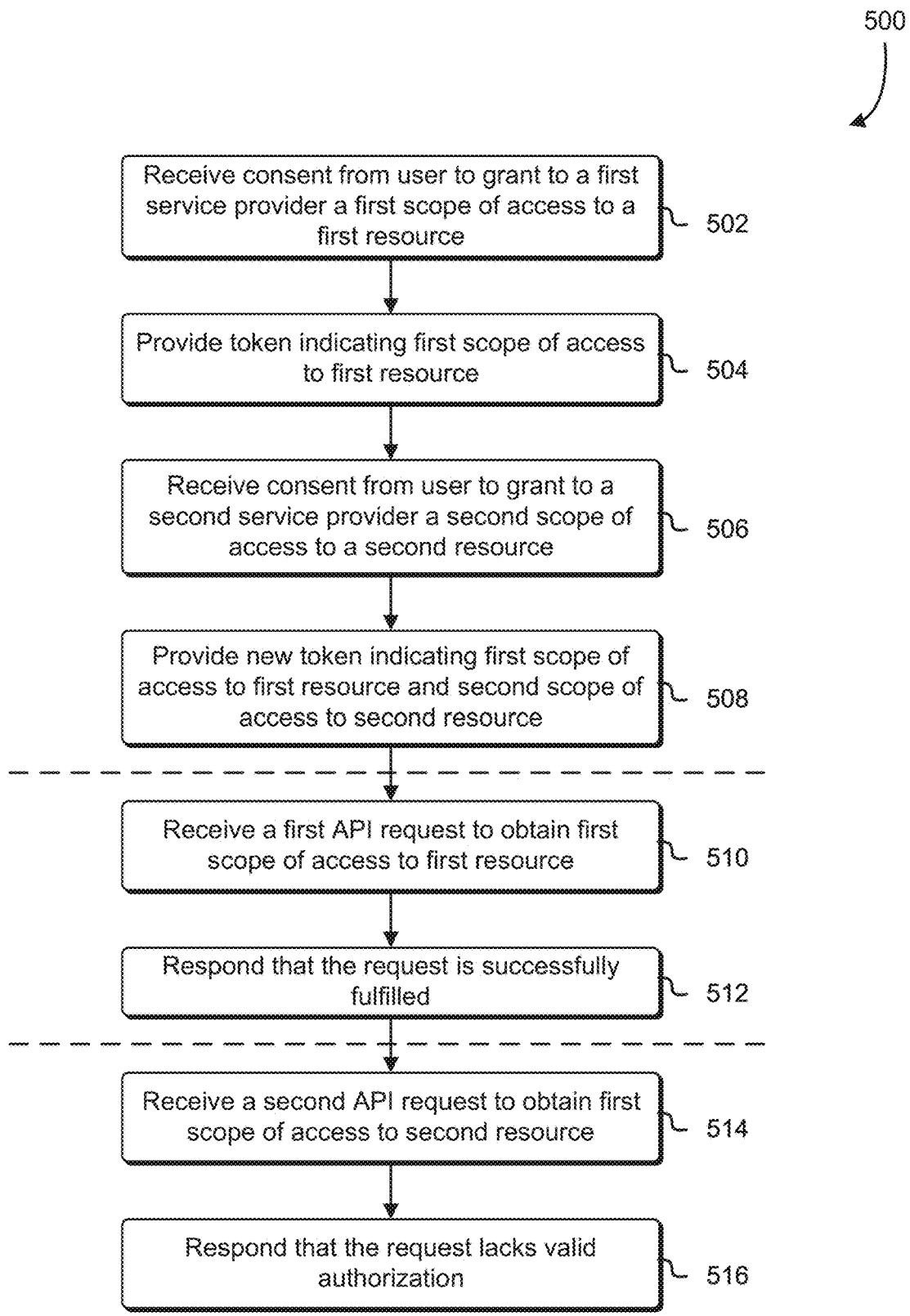
FIG. 5 is a flowchart that illustrates an example of an algorithm to authorize access and/or decline access to resources, in accordance with an embodiment.

FIG. 5 is a flowchart illustrating an example of a process 500 for an algorithm to authorize access and/or decline access to resources, in accordance with various embodiments. Some or all of the process 500 (or any other processes described, or variations and/or combinations of those processes) may be performed by computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing device 800 of FIG. 8. The process 500 includes a series of operations wherein consent from an end user is received by the resource management system performing the process 500 to provide authorized service providers access to resources of the resource management system, or deny access to the resources.

In at least one embodiment, in 502, one or more processors of the resource management system, or alternatively known as a computing system or system, receive consent from a user of the system to grant to a first service provider a first scope of access to a first resource. In at least one embodiment, one or more processors of the resource management system receive consent from an end user of the resource management system to provide a set of resources with a corresponding scope of access (e.g., user profile, resource identifier, and resource details) to be linked with a service provider. In at least one embodiment, the consent provides a permission of the service provider to access the set of resources with the corresponding scope. In at least one embodiment, the resource management system receives this consent from the user as a result of the user being redirected to the resource management system from a fourth party application or service provider, such as application(s) 104 in FIG. 1.

In at least one embodiment, in 504, in response to receiving consent from the user of the system to grant to the first service provider the first scope of access to the first resource, the one or more processors of the resource management system provides an access token with the first scope of access to first resource. In at least one embodiment, the one or more processors of the resource management system provide an access token to a token storage provider. In at least one embodiment, the access token includes permission of the service provider to access the set of resources with the corresponding scope.

In at least one embodiment, in 506, the one or more processors of the resource management system receive an additional consent from the user of the system to grant to a second service provider a second scope of access to a second resource. In at least one embodiment, a processor of the resource management system receives an additional consent from the end user of the resource management system to provide another set of resources with a corresponding scope of access to be linked with a different service provider. In at least one embodiment, the additional consent provides another permission of the different service provider to access the other set of resources with its corresponding scope. In at least one embodiment, the other permission of the different service provider is provided subsequent to a previous permission.

In at least one embodiment, in 508, in response to receiving the additional consent from the user of the system to grant to the second service provider the second scope of access to the second resource, the one or more processors of the resource management system provide a new token with the first scope of access to the first resource and the second scope of access to the second resource. In at least one embodiment, a processor of the resource management system provides a new access token to the token storage provider. In at least one embodiment, the new access token includes a union of the permission (e.g., a previous permission) of the service provider to access the set of resources with the corresponding scope and the other permission of the different service provider to access the other set of resources with its corresponding scope.

At some time thereafter (that is, after a token is generated that indicates a first scope of access to the first resource, such as after 504 or 508), as indicated by the dashed line, in 510, the system performing the process receives an API request from the second service provider to access the first resource according to the first scope of access. In at least one embodiment, in 510, the one or more processors of the resource management system receive a first API call that, if invoked, causes a computer system to perform instructions to attempt to obtain a first scope of access to a first resource of the user. In at least one embodiment, a processor of the resource management system receives an API call that, if invoked, causes a computer system to perform instructions to request access of the set of resources with the corresponding scope of access (e.g., a first scope of a first resource). In at least one embodiment, in response to the API call, the resource management system returns a code indicating the request was successfully performed 512 (e.g., "200 Ok"). In at least one embodiment, the response that the request was successful performed 512 indicates that the service provider is authorized to access the set of resources with the corresponding scopes, by using the new token. In at least one embodiment, by using an access token, such as the new token, that includes information indicating permission to an aggregation of scopes, a fourth party application, such as this service provider, can access data only to user-consented resources.

At yet another time, as indicated by the dashed line, in 514, the system performing the process receives an API request from the second service provider to access the second resource according to the first scope of access. As can be observed from the preceding steps, this scope of access to this resource has not yet been granted by the user. In at least one embodiment, in 514, the one or more processors of the resource management system receive a second API request that, if invoked, causes a computer system to perform instructions to attempt to obtain a first scope of access to the second resource. In at least one embodiment, the one or more processors of the resource management system receive an additional API call that, if invoked, causes a computer system to perform instructions to request access of the other set of resources with the scope corresponding to the set of resources (e.g., a first scope of the second resource). In at least one embodiment, in response to the second API request, the resource management system returns an unauthorized code 516 (e.g., "401 Unauthorized"). In at least one embodiment, the response of unauthorized code 516 indicates that the different service provider is not authorized to access the set of resources with the corresponding scopes, by using the new token. For example, the token storage provider, acting on behalf of a fourth-party application, requests access to resources or data that are not user consented resources. In at least one embodiment, the token storage provider ensures that the access to the set of resources is only provided to an authorized fourth-party application, in accordance with the permissions of the access token.

In at least one embodiment, an exemplary process 500 includes a processor using one or more circuits of a resource management system to obtain an access token that includes a plurality of permissions of service providers and provides access to or declines access to resources of an end user of the resources management system and/or otherwise perform operations described herein. In at least one embodiment, parts, methods and/or systems described in connection with FIG. 5 are as further illustrated non-exclusively in any FIG. 1-8. Note that one or more of the operations performed in 504-16 may be performed in various orders and combinations, including in parallel.

Figure 6:
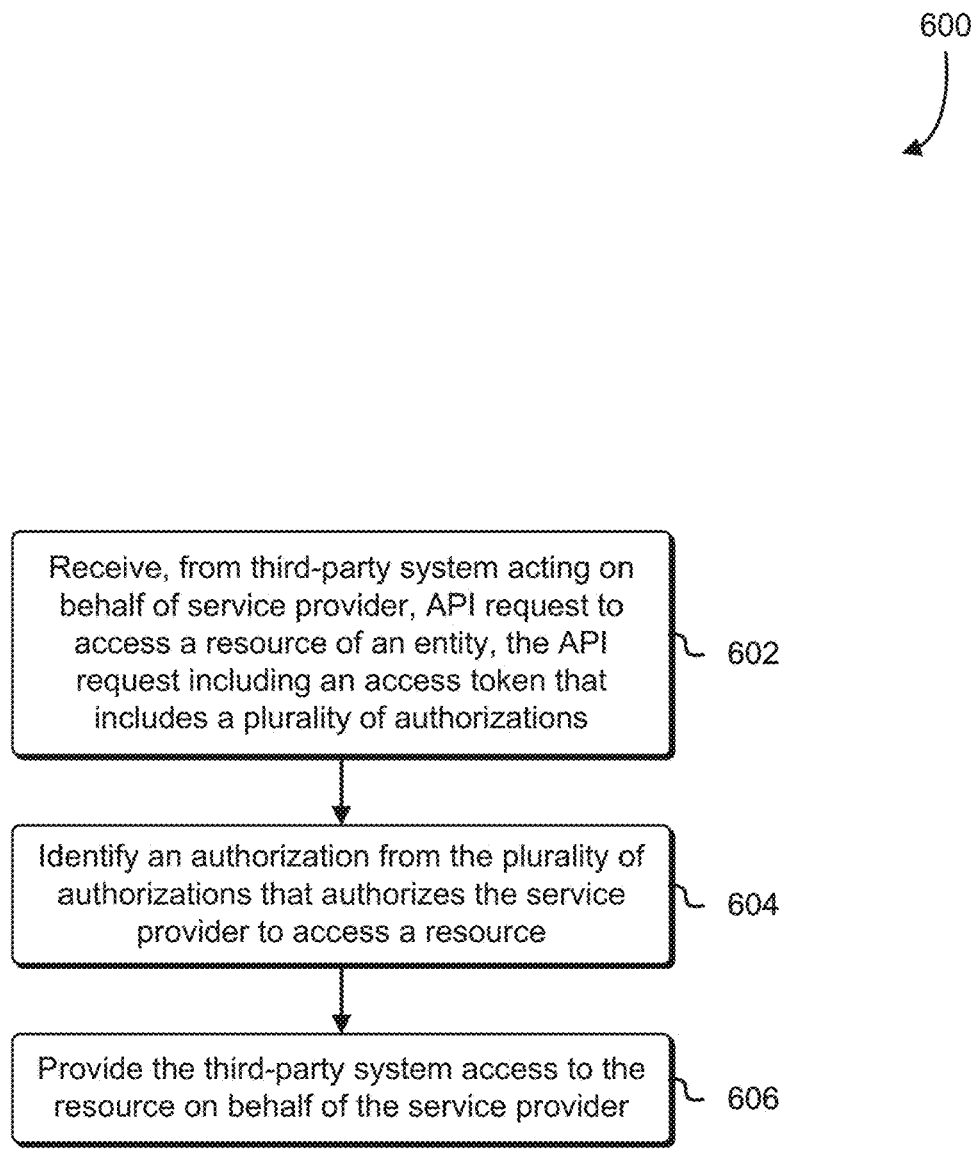
FIG. 6 is a flowchart that illustrates an example of an algorithm to use an access token to access resources, in accordance with an embodiment.

FIG. 6 is a flowchart illustrating an example of a process 600 of an algorithm to use an access token to access resources of an end user of the resources management system, in accordance with various embodiments. Some or all of the process 600 (or any other processes described, or variations and/or combinations of those processes) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 800 of FIG. 8. The process 600 includes a series of operations wherein a request is received by the system performing process 600 to access a resource, identify permission to access a resource, and, as a result of receiving the request, provide a token storage service access to the resource of the end user of the resource management system.

In at least one embodiment, in 602, one or more processors of the resource management system receive from a token storage service acting on behalf of a service provider, an API call to access a set of resources of an entity of the resource management system. In at least one embodiment, the API call includes an access token that includes a plurality of permissions. In at least one embodiment, the token storage service aggregates all authorized requests for fourth-party applications. In at least one embodiment, the resource management system provides only one opaque token to the token storage system, also known as a third-party aggregator, instead of one token per fourth-party application for the same end user. In at least one embodiment, using the one opaque token, the fourth-party application can access data only to which the end user has consented. In at least one embodiment, the resource management system will perform instructions to decline the request for all other data that the end user has not consented to.

In at least one embodiment, in 604, the one or more processors of the resource management system identify a permission, from the plurality of permissions, that authorizes the service provider to access the set of resources. In 606, the one or more processors of the resource management system provide the third-party system access to the set of resources on behalf of the service provider. In at least one embodiment, this third-party service performs operations to distribute resources of the end user of the resource management system only to the authorized applications.

In some embodiments, a user of the resource management system may decide to revoke a permission of service provider, also known as a fourth-party application, to access particular scopes of resources of the user. For example, in at least one embodiment, the one or more processors of the resource management system receives an API call to revoke a first permission of a service provider to access a set of resources of a user of the resource management system, obtain a token that includes the first permission and a second permission to access a second set of resources of the user. In at least one embodiment, as a result of receiving the API call, the resource management system re-generates the token to include the second permission and omits the first permission. For example, if the resource management system receives an API call from the token storage service, acting on behalf of the service provider, to access the second set of resources, the system will return an unauthorized code, similar to "401 Unauthorized" request 516 in FIG. 5.

In at least one embodiment, an exemplary process 600 includes a processor using one or more circuits of a resource management system to obtain an access token that includes a plurality of permissions of service providers and provides access to or declines access to resources of an end user of the resources management system and/or otherwise perform operations described herein. In at least one embodiment, parts, methods and/or systems described in connection with FIG. 6 are as further illustrated non-exclusively in any FIG. 1-8. Note that one or more of the operations performed in 602-06 may be performed in various orders and combinations, including in parallel.

Figure 7:
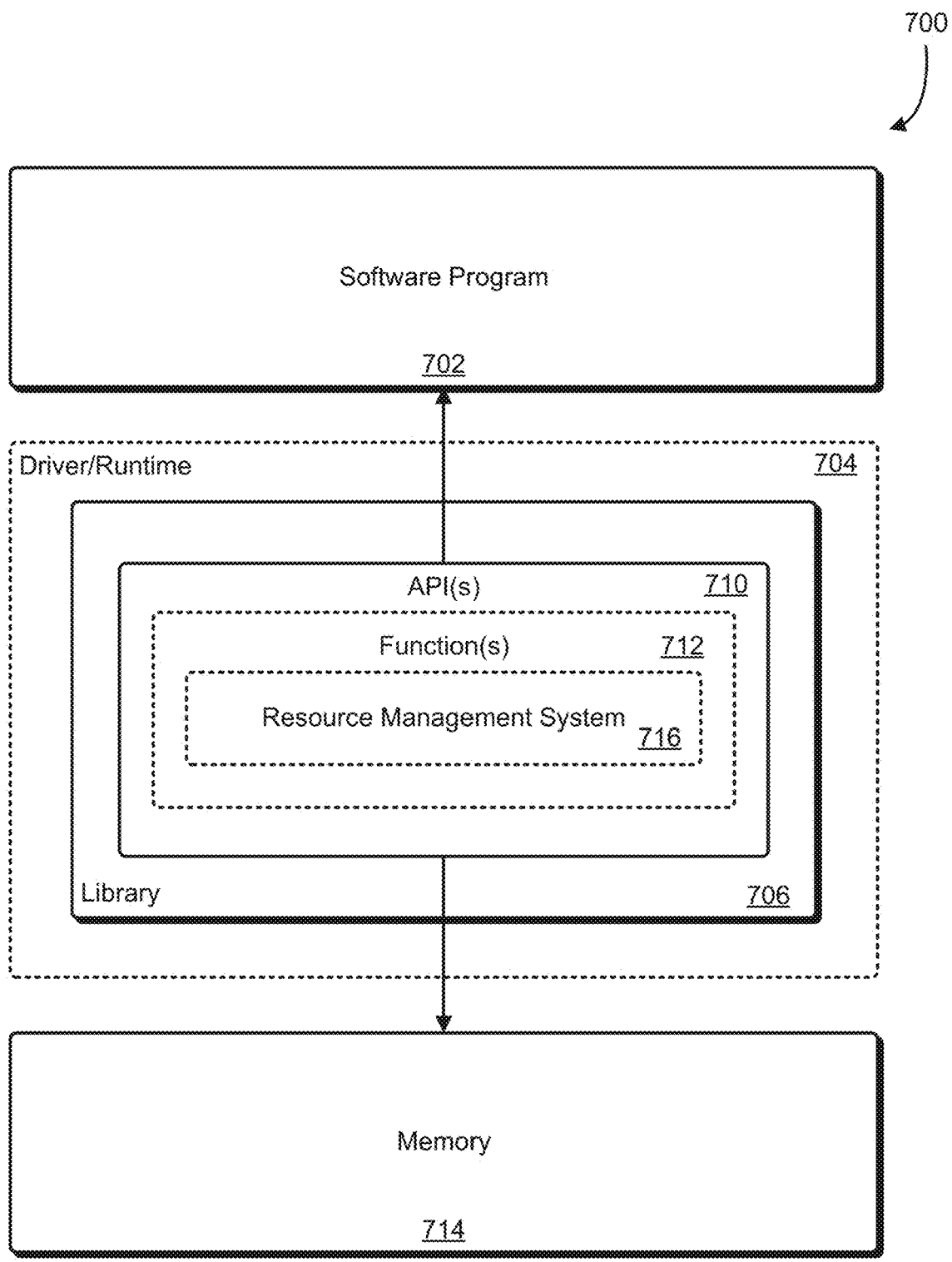
FIG. 7 illustrates an application programming interface that returns a candidate location, in accordance with an embodiment.

FIG. 7 is a block diagram illustrating driver and/or runtime software comprising one or more libraries to provide one or more application programming interfaces (APIs), in accordance with at least one embodiment. In at least one embodiment, a software program 702 is a software module. In at least one embodiment, a software program 702 comprises one or more software modules. In at least one embodiment, one or more APIs 710 are sets of software instructions that, if executed, cause one or more processors to perform one or more computational operations. In at least one embodiment, one or more APIs 710 are distributed or otherwise provided as a part of one or more libraries 706, runtimes 704, drivers 704, and/or any other grouping of software and/or executable code further described herein. In at least one embodiment, one or more APIs 710 perform one or more computational operations in response to invocation by software programs 702. In at least one embodiment, a software program 702 is a collection of software code, commands, instructions, or other sequences of text to instruct a computing device to perform one or more computational operations and/or invoke one or more other sets of instructions, such as APIs 710 or API functions 712, to be executed. In at least one embodiment, functionality provided by one or more APIs 710 includes software functions 712, such as those usable to accelerate one or more portions of software programs 702 using one or more parallel processing units (PPUs), such as graphics processing units (GPUs). In at least one embodiment, a software program is a compiler.

In at least one embodiment, APIs 710 are hardware interfaces to one or more circuits to perform one or more computational operations. In at least one embodiment, one or more software APIs 710 described herein are implemented as one or more circuits to perform one or more techniques described below in conjunction with FIGS. 2-6. In at least one embodiment, one or more software programs 702 comprise instructions that, if executed, cause one or more hardware devices and/or circuits to perform one or more techniques further described below in conjunction with FIGS. 2-6.

In at least one embodiment, software programs 702, such as user-implemented software programs, utilize one or more application programming interfaces (APIs) 710 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 710 provide a set of callable functions 712, referred to herein as APIs, API functions, and/or functions, that individually perform one or more computing operations, such as computing operations related to parallel computing. For example, in an embodiment, one or more APIs 710 provide functions 712 to cause resource management system 716 to generate an access token to authorize a service provider to access resources of a user.

In at least one embodiment, one or more software programs 702 interact or otherwise communicate with one or more APIs 710 to perform one or more computing operations using one or more PPUs, such as GPUs. In at least one embodiment, one or more computing operations using one or more PPUs comprise at least one or more groups of computing operations to be accelerated by execution at least in part by the one or more PPUs. In at least one embodiment, one or more software programs 702 interact with one or more APIs 710 to facilitate parallel computing using a remote or local interface.

In at least one embodiment, an interface is software instructions that, if executed, provide access to one or more functions 712 provided by one or more APIs 710. In at least one embodiment, a software program 702 uses a local interface when a software developer compiles the one or more software programs 702 in conjunction with one or more libraries 706 comprising or otherwise providing access to one or more APIs 710. In at least one embodiment, one or more software programs 702 are compiled statically in conjunction with pre-compiled libraries 706 or uncompiled source code comprising instructions to perform one or more APIs 710. In at least one embodiment, one or more software programs 702 are compiled dynamically and the one or more software programs utilize a linker to link to one or more pre-compiled libraries 706 comprising one or more APIs 710.

In at least one embodiment, a software program 702 uses a remote interface when a software developer executes a software program that utilizes or otherwise communicates with a library 706 comprising one or more APIs 710 over a network or other remote communication medium. In at least one embodiment, one or more libraries 706 comprising one or more APIs 710 are to be performed by a remote computing service, such as a computing resource services provider. In another embodiment, one or more libraries 706 comprising one or more APIs 710 are to be performed by any other computing host providing the one or more APIs 710 to one or more software programs 702.

In at least one embodiment, a processor performing or using one or more software programs 702 calls, uses, performs, or otherwise implements one or more APIs 710 to allocate and otherwise manage memory to be used by the software programs 702. In at least one embodiment, one or more software programs 702 utilize one or more APIs 710 to allocate and otherwise manage memory to be used by one or more portions of the software programs 702 to be accelerated using one or more PPUs, such as GPUs or any other accelerator or processor further described herein. Those software programs 702 request a resource management system 716 receive and API call to obtain an access token, identify permissions, and generate the access token using functions 712 provided, in an embodiment, by one or more APIs 710.

In at least one embodiment, an API 710 is an API to facilitate parallel computing. In at least one embodiment, an API 710 is any other API further described herein. In at least one embodiment, an API 710 is provided by driver and/or runtime software 704. In at least one embodiment, an API 710 is provided by a CUDA user-mode driver. In at least one embodiment, an API 710 is provided by a CUDA runtime. In at least one embodiment, driver and/or runtime software 704 is data values and software instructions that, if executed, perform or otherwise facilitate operation of one or more functions 712 of an API 710 during load and execution of one or more portions of a software program 702. In at least one embodiment, a runtime 704 is data values and software instructions that, if executed, perform, or otherwise facilitate operation of one or more functions 712 of an API 710 during execution of a software program 702. In at least one embodiment, one or more software programs 702 utilize one or more APIs 710 implemented or otherwise provided by driver and/or runtime software 704 to perform combined arithmetic operations by the one or more software programs 702 during execution by one or more PPUs, such as GPUs.

In at least one embodiment, one or more software programs 702 utilize one or more APIs 710 provided by driver and/or runtime software 704 to perform combined arithmetic operations of one or more PPUs, such as GPUs. In at least one embodiment, one or more APIs 710 provide combined arithmetic operations through driver and/or runtime software 704, as described above. In at least one embodiment, one or more software programs 702 utilize one or more APIs 710 provided by driver and/or runtime software 704 to allocate or otherwise reserve one or more blocks of memory 714 of one or more PPUs, such as GPUs. In at least one embodiment, one or more software programs 702 utilize one or more APIs 710 provided by driver and/or runtime software 704 to allocate or otherwise reserve blocks of memory. In at least one embodiment, one or more APIs 710 are to perform combined arithmetic operations, as described below in conjunction with any of FIGS. 1-6.

To improve software programs 702 usability and/or optimization of one or more portions of the software programs 702 to be accelerated by one or more PPUs, such as GPUs, in an embodiment, one or more APIs 710 provide one or more API functions 712 to perform a neural network usable or used by one or more computing devices as described above and further described below in conjunction with FIGS. 1-6. In at least one embodiment, an exemplary block diagram 700 depicts a processor, comprising one or more circuits to perform one or more software programs to combine two or more application programming interfaces (APIs) into a single API. In at least one embodiment, an exemplary block diagram 700 depicts a system, comprising one or more processors to perform one or more software programs to combine two or more application programming interfaces (APIs) into a single API. In at least one embodiment, a processor uses an API to cause a resource management system 716 to receive a request including a permission of a service provider to access resources of a user, identify a previous permission to access different resources, and, as a result, generate an access token that includes the previous permission and the permission. In at least one embodiment, an exemplary block diagram 700 illustrates an API to invoke a resources management system to generate an access token to include multiple permissions.

In at least one embodiment, parts, methods and/or a system described in connection with FIG. 7 are as further illustrated non-exclusively in any FIG. 1-7.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 8:
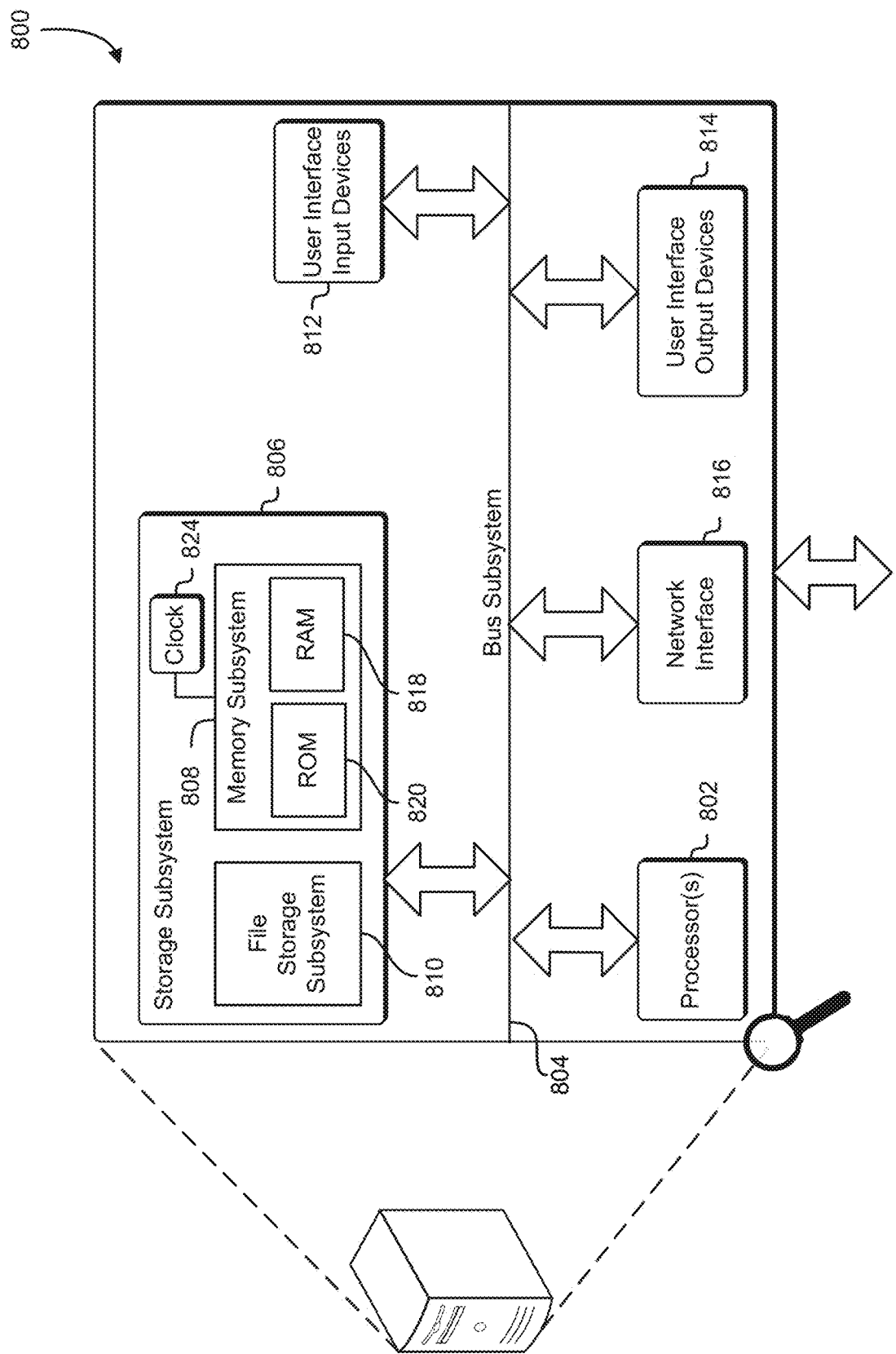
FIG. 8 illustrates a computing device that may be used in accordance with at least one embodiment/an environment in which various embodiments can be implemented.

FIG. 8 is an illustrative, simplified block diagram of a computing device 800 that can be used to practice at least one embodiment of the present disclosure. In various embodiments, the computing device 800 includes any appropriate device operable to send and/or receive requests, messages, or information over an appropriate network and convey information back to a user of the device. The computing device 800 may be used to implement any of the systems illustrated and described above. For example, the computing device 800 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 800 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 8, the computing device 800 may include one or more processors 802 that, in embodiments, communicate with and are operatively coupled to a number of peripheral subsystems via a bus subsystem. In some embodiments, these peripheral subsystems include a storage subsystem 806, comprising a memory subsystem 808 and a file/disk storage subsystem 810, one or more user interface input devices 812, one or more user interface output devices 814, and a network interface subsystem 816. Such storage subsystem 806 may be used for temporary or long-term storage of information.

In some embodiments, the bus subsystem 804 may provide a mechanism for enabling the various components and subsystems of computing device 800 to communicate with each other as intended. Although the bus subsystem 804 is shown schematically as a single bus, alternative embodiments of the bus subsystem utilize multiple buses. The network interface subsystem 816 may provide an interface to other computing devices and networks. The network interface subsystem 816 may serve as an interface for receiving data from and transmitting data to other systems from the computing device 800. In some embodiments, the bus subsystem 804 is utilized for communicating data such as details, search terms, and so on. In an embodiment, the network interface subsystem 816 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 816 is enabled by wired and/or wireless connections and combinations thereof.

In some embodiments, the user interface input devices 812 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random-access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The at least one local clock 824, in some embodiments, is a counter that represents the number of ticks that have transpired from a particular starting date and, in some embodiments, is located integrally within the computing device 800. In various embodiments, the at least one local clock 824 is used to synchronize data transfers in the processors for the computing device 800 and the subsystems included therein at specific clock pulses and can be used to coordinate synchronous operations between the computing device 800 and other systems in a data center. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 800 may include any appropriate hardware, software, and firmware for integrating with a data store as needed to execute aspects of one or more applications for the computing device 800 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 800 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 800 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 800 may provide the content in one or more forms including, but not limited to, forms that are perceptible to the user audibly, visually, and/or through other senses. The handling of requests and responses, as well as the delivery of content, in an embodiment, is handled by the computing device 800 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 800 typically will include an operating system that provides executable program instructions for the general administration and operation of the computing device 800 and includes a computer-readable storage medium (e.g., a hard disk, random access memory (RAM), read only memory (ROM), etc.) storing instructions that if executed (e.g., as a result of being executed) by a processor of the computing device 800 cause or otherwise allow the computing device 800 to perform its intended functions (e.g., the functions are performed as a result of one or more processors of the computing device 800 executing instructions stored on a computer-readable storage medium).

In an embodiment, the computing device 800 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 800 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 800 is capable of storing, retrieving, and accessing structured or unstructured data. In an embodiment, computing device 800 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention, and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   one or more processors; and
   memory storing computer-executable instructions that, as a result of execution by the one or more processors, cause the system to at least:
      receive an application programming interface (API) call to obtain an access data object that includes a permission of an application provider to access a first resource of an entity;
      identify a previous permission to access a second resource of the entity;
      in response to receiving the API call, generate the access data object to include at least the permission and the previous permission;
      receive an additional API call requesting to revoke the permission or the previous permission;
      provide a notification to the entity that includes a confirmation request to confirm that the additional API call is approved;
      receive a confirmation to the confirmation request; and
      modify the access data object to remove the permission or the previous permission requested to be revoked by the additional API call.

2. The system of claim 1, wherein the permission and the previous permission are both authorized by the entity.

3. The system of claim 1, wherein the computer-executable instructions include executable instructions that further cause the system to refresh the access data object to generate a refreshed access data object.

4. The system of claim 1, wherein the computer-executable instructions include executable instructions that further cause the system to:
   receive an additional API call to provide the application provider access to the second resource of the entity; and
   as a result of a determination that the access data object does not permit the application provider to access the second resource, block the application provider from accessing the second resource.

5. The system of claim 1, wherein:
   the API call is received from an aggregator system; and
   the computer-executable instructions include executable instructions that further cause the system to at least:
      determine that the application provider is authorized to access the first resource by using the access data object; and
      cause the aggregator system to provide the application provider access to the first resource of the entity.

6. The system of claim 1, wherein the computer-executable instructions include executable instructions that further cause the system to provide an aggregator system access to both the first resource and the second resource, by using the access data object in another API call.

7. The system of claim 1, wherein the computer-executable instructions that cause the system to generate the access data object include executable instructions that further cause the system to cause the access data object to be stored in a data storage system.

8. A computer-implemented method, comprising:
receiving an application programming interface (API) call to obtain an access data object that includes a permission of an application provider to access a first resource of an entity;
identifying a previous permission to access a second resource of the entity; as a result of receiving the API call, generating the access data object to include at least the permission and the previous permission;
receiving an additional API call requesting to revoke the permission or the previous permission;
providing a notification to the entity that includes a confirmation request to confirm that the additional API call is approved;
receiving a confirmation to the confirmation request; and
modifying the access data object to remove the permission or the previous permission requested to be revoked by the additional API call.

9. The computer-implemented method of claim 8, further comprising:
causing an aggregator system to record the access data object; and
receiving an additional API call, from the aggregator system, to obtain access to both the first resource and the second resource by using at least the access data object.

10. The computer-implemented method of claim 8, wherein the access data object comprises one or more of:
an identifier of an aggregator system or the application provider,
an identifier of the entity,
an indication of scope of access to the first resource, or
an indication of expiration of the access data object.

11. The computer-implemented method of claim 8, further comprising:
receiving an additional API call to access the first resource, the additional API call identifying the application provider;
determining, from the access data object, that the application provider is authorized to access the first resource; and
providing the application provider access to the first resource.

12. The computer-implemented method of claim 8, further comprising:
receiving an additional API call to access a third resource of the entity; and
as a result of identifying that the access data object does not include a permission to access the third resource, blocking the access to the third resource.

13. The computer-implemented method of claim 8, further comprising providing an aggregator system access to both the first resource and the second resource using the access data object via an access API call.

14. The computer-implemented method of claim 8, wherein the additional API call is received from a token storage service.

15. A non-transitory computer-readable storage storing computer-executable instructions that, if executed by one or more processors of a computer system, cause the computer system to:
receive an application programming interface (API) call to generate an access data object that includes a permission of an application provider to access a first resource of an entity;
identify a previous permission to access a second resource of the entity;
as a result of receiving the API call, generate the access data object to include at least the permission and the previous permission;
receive an additional API call requesting to revoke the permission or the previous permission;
provide a notification to the entity that includes a confirmation request to confirm that the additional API call is approved;
receive a confirmation to the confirmation request; and
modify the access data object to remove the permission or the previous permission requested to be revoked by the additional API call.

16. The non-transitory computer-readable storage of claim 15, wherein the computer-executable instructions further comprise executable instructions that further cause the computer system to refresh the access data object after a specified period of time has passed.

17. The non-transitory computer-readable storage of claim 15, wherein the access data object includes an attribute indicating a scope of access to one or more resources of the entity.

18. The non-transitory computer-readable storage of claim 15, wherein the computer-readable storage further stores computer-executable instructions that further cause the computer system to, as a result of a specified period of time elapsing, receive a reauthorization of the application provider to access the first resource of the entity, the reauthorization restarting the specified period of time.

19. The non-transitory computer-readable storage of claim 15, wherein the access data object comprises a union of each of the permission and the previous permission that is usable by an aggregator system to access both the first resource and the second resource, by invoking a single API call.

20. The non-transitory computer-readable storage of claim 15, wherein the computer-executable instructions further comprise executable instructions that further cause the computer system to:
receive an additional API call to access a third resource of the entity; and
as a result of identifying that the access data object does not include a respective permission to access the third resource, providing an error message indicating that access to the third resource is denied.

* * * * *